Oct. 10, 1944.  N. FLESCH  2,359,732
SLACK ADJUSTER
Filed Aug. 27, 1942
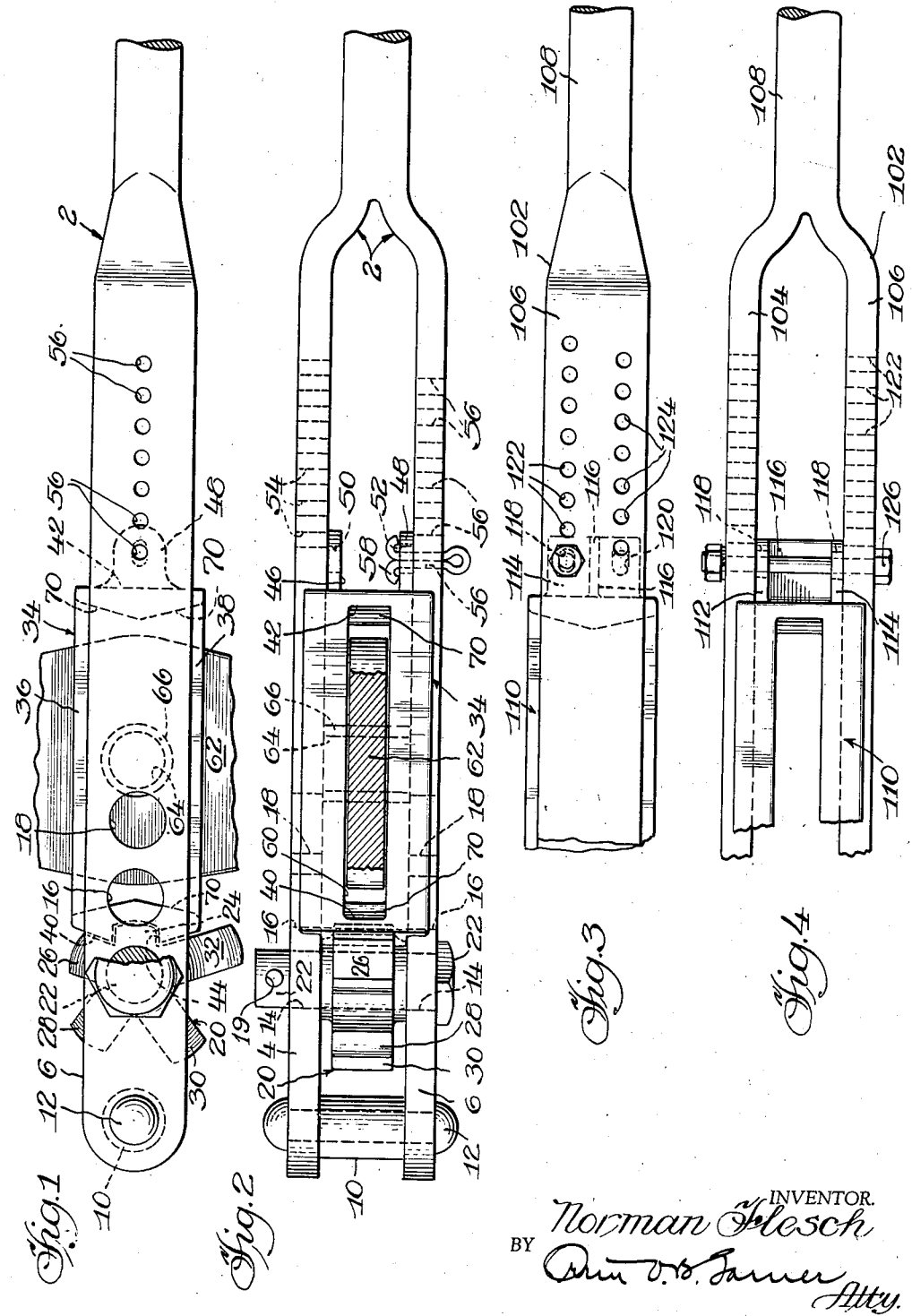
INVENTOR.
Norman Flesch
BY
Atty.

Patented Oct. 10, 1944

2,359,732

UNITED STATES PATENT OFFICE 2,359,732

SLACK ADJUSTER

Norman Flesch, Chicago, Ill., assignor to American Steel Foundries, Chicago, Ill., a corporation of New Jersey Application August 27, 1942, Serial No. 456,331

20 Claims. (Cl. 188—197)

My invention relates to railway brake rigging and more particularly to a slack adjuster device designed to be associated with an end of a pull rod affording a connection between associated truck levers utilized in said rigging.

An object of my invention is to provide a slack adjuster of the above described type which may be cheaply manufactured and which will, nevertheless, provide the fine increments of adjustment desirable in such a device.

A further object of my invention is to design a slack adjuster mechanism for a device such as above described which may be utilized in a slack adjuster body formed by forging the ends of a pair of standard straps, thus avoiding the necessity of the expensive process of forging the entire slack adjuster body.

My invention comprehends a mechanism in which a brake lever support block is mounted in the slack adjuster body and is movable longitudinally thereof, said block being adjustably restrained against movement in one direction within said body by means of a ratchet device, and said block also being restrained against movement in the opposite direction within said body by means of a securing pin or bolt and nut assembly.

A specific object of my invention is the provision of ratchet means in a slack adjuster such as above described, said ratchet means comprising a plurality of lugs of progressively varying lengths and adapted to be selectively engaged with the associated end of a brake lever support block slidably mounted in the slack adjuster body.

A further object of my invention is to provide a pivotal support for a brake lever in the support block above-mentioned, said pivotal support being formed and arranged to permit the insertion and removal of said lever from an associated slot in the support block without removing said block from the slack adjuster body.

Still another object of my invention is to provide a means of securing the end of the support block remote from the ratchet member above described, said means comprising in one modification of my invention spaced lugs on the support block comprising openings adapted to be alternatively registered with openings in the respective straps defining the slack adjuster body, and said means comprising in another modification of my invention spaced lugs on the support block, each comprising upper and lower openings adapted to register alternatively with upper and lower openings in the associated strap, the corresponding openings in the straps being aligned to permit securement of both lugs to both straps by means of a single bolt.

In the drawing,

Figure 1 is a side elevation of my novel slack adjuster device, and Figure 2 is a top plan view of the structure shown in Figure 1.

Figures 3 and 4 are respectively a side elevation and top plan view of a modification of the arrangement shown in Figures 1 and 2.

Describing my invention in detail, and referring first to the modification shown in Figures 1 and 2, the slack adjuster body generally designated 2 is defined by the spaced straps 4 and 6, said straps being connected at the outer end of the body 2 by a ferrule 10 and a rivet 12 extending through said straps and said ferrule whereby spreading of the straps is prevented during application of pulling forces to the associated brake lever as hereinafter described by means of the pull rod (not shown) connected to the slack adjuster body 2. Three relatively large openings 14, 16, and 18 are provided through each strap adjacent the outer end of the body 2, corresponding openings in the respective straps being in alignment, and a ratchet member generally designated 20 is pivotally secured within the body 2 by means of a pin 22 extending therethrough and through a pair of said aligned openings 14, 14, 16, 16 or 18, 18, the pin being provided with a suitable opening for a cotter pin or other convenient securing means as indicated at 19 (Figure 2). The ratchet member 20 comprises a plurality of lugs 24, 26, 28, 30, and 32, said lugs being of progressively varying lengths, the lug 24 being the shortest of the group.

A block generally designated 34 is movably mounted within the body 2, said block comprising top and bottom flanges 36 and 38 (Figure 1) on each side thereof and engaged respectively with the upper and lower edges of the associated strap 4 or 6, said flanges permitting movement of the block longitudinally of the body 2 while maintaining said block in its proper position in longitudinal alignment with the straps 4 and 6.

The block 34 comprises the end walls 40 and 42, the end wall 40 comprising a recess 44 (Figure 1) formed and arranged for the reception of one of the lugs on the ratchet 20, and the end wall 42 being provided with spaced lugs 46 and 48 comprising respectively the openings 50 and 52 (Figure 1) therethrough. The strap 4 comprises a plurality of openings 54, 54 formed and arranged to register with the opening 50 in the lug 46 when certain of the lugs on the ratchet are engaged with the opposite end of the block, as hereinafter more fully described, and the strap 6 comprises openings 56, 56 adapted to register with the opening 52 in the lug 48 when other of the lugs on said ratchet are engaged with the opposite end of the block, as hereinafter more fully described.

It will be apparent that as the ratchet 20 is rotated the lugs thereon may be progressively engaged with the recess 44 in the block 34. The openings 50 and 52 in the respective lugs 46 and 48 are thus alternatively registered respectively with the openings 54, 54 in the strap 4, and the openings 56, 56 in the strap 6 in order to accommodate reception of the cotter pin 58, said pin restraining said block against movement inwardly with respect to said body member as hereinafter more fully described. In this connection, it may be noted that the openings 50 and 52 are somewhat larger than the cotter pin 58 whereby said cotter pin is relieved of shearing stresses as the slack adjuster body 2 moves to the right as shown in Figures 1 and 2 to transmit braking forces to the block 34 and thence to the associated brake lever. It will also be understood that the pivotal connection of the ratchet 20 to the body 2 is likewise adjustable longitudinally thereof inasmuch as said ratchet may be connected by means of the pin 22 extending through the openings 14, 14, 16, 16 or 18, 18 as desired.

The block 34 also comprises a brake lever slot 60 formed and arranged for reception of the brake lever fragmentarily indicated at 62, said lever being pivotally supported from said block by means of a headless pin 64 bushed as at 66 and extending through aligned openings in said block and said lever, said pin being retained in assembled relationship by abutment at opposite ends thereof with respective straps 4 and 6, as will be clearly apparent from a consideration of Figure 2. It may be noted that the end walls 40 and 42 of the block 34 are beveled on the inner surfaces thereof as at 70, 70 within the slot 60 in order to afford clearance for the lever 62 as it pivots on its supporting pin 64.

In assembling my novel slack adjuster, the body 2, formed by forging together the ends of a pair of standard straps, is engaged with the block 34, and thereafter said straps are connected by means of the ferrule 10 and rivet 12. The brake lever 62 is then inserted within the slot 60 in the brake lever support block 34 and the aligned openings in said lever and said block are aligned with the openings 18, 18 in the straps in order to permit the insertion of the headless pin 64, after which the block is moved to the right as seen in Figures 1 and 2. The ratchet 20 is then pivotally connected by means of the bolt 22 extending through the openings 14, 14, 16, 16 or 18, 18, and the desired ratchet lug is positioned within the recess 44 in the block. Thereafter the end of the block remote from the ratchet is secured by means of the cotter pin 58 or other convenient securing means extending through the opening in one of the lugs 46 or 48 and through the associated opening 54 or 56 in the associated strap.

It will be understood that when the brake mechanism associated with the structure above described is actuated, the slack adjuster body will be moved to the right as shown in Figures 1 and 2, and pull will be transmitted to the block 34 through the ratchet 20 and from the block 34 to the brake lever 62; and upon release of the brake mechanism the body 2 will be moved to the left as seen in Figures 1 and 2 and the movement thereof will be transmitted to the lever 62 by means of the connection between one of the lugs 46 or 48 on the block to the associated strap. It will be understood that upon actuation of the brake mechanism relatively large forces will be transmitted to the block 34, thus requiring a substantial pin 22 connecting the ratchet to the straps, whereas upon release of the brake mechanism relatively slight forces will be transmitted to the block 34 and thus the cotter pin 58 will be sufficient for this purpose.

Figures 3 and 4 show a modified form of my invention illustrating a different method of securing the end of the block remote from the ratchet member. In this modification the slack adjuster body 102 is defined by the spaced straps 104 and 106, said straps being forged together to form a round bar 108 at one end of the slack adjuster body 102, said round bar being formed and arranged to be welded to a standard pull rod in any convenient manner. A brake lever support block 110 is movably mounted within the body 102 and is adjustably secured at one end thereof by means of a ratchet (not shown) in manner identical with that described for the previous modification, said block comprising at the end thereof remote from the ratchet member the spaced lugs 112 and 114 (Figure 4) joined by the reinforcing web 116 and each comprising spaced upper and lower openings 118 and 120, the openings 118, 118 being adapted to register with the upper openings 122, 122 in the respective straps, and the openings 120, 120 being adaped to register with the lower openings 124, 124 in said straps. The upper openings 122 in each strap are alternately arranged with respect to the lower openings 124 therein and the openings 122 and 124 in each strap are aligned with the corresponding openings in the other strap whereby both of the lugs 112 and 114 may be secured to both of the straps 104 and 106 by means of a bolt and nut assembly designated 126. It will be apparent that the openings 118 and 120 in the lugs 112 and 114 are slightly larger than the bolt 126 in order to accommodate slack between the block and the ratchet in order to prevent shearing stresses on the bolt 126 as pull is imparted to the associated brake lever through the body 102 as in the previous modification.

It will be understood that the modification shown in Figures 3 and 4 is substantially identical with that shown in Figures 1 and 2, except for the manner of securing the end of the block remote from the ratchet member as above described.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a slack adjuster, a body defined by spaced straps, a block positioned between said straps and movable longitudinally with respect thereto, guide flanges on each side of said block engaged respectively with the top and bottom of the associated strap, a longitudinal slot and a transverse pin opening through said block, a brake lever in said slot and a headless pin extending through said pin opening for pivotal support of said lever, said pin being retained in assembled relationship by abutment at opposite ends with respective straps, a ratchet member pivotally supported between said straps and comprising a plurality of lugs of progressively varying lengths and adapted to be engaged with one end of said block, alternately arranged openings in said straps adjacent the opposite end of said block, and a retaining member adapted to engage said opposite end and to be selectively engaged with the last-mentioned openings.

2. In a slack adjuster, a body defined by spaced straps, a block positioned between said straps and movable longitudinally with respect thereto, guide flanges on each side of said block engaged respectively with the top and bottom of the associated strap, a longitudinal slot and a transverse pin opening through said block, a brake lever in said slot and a headless pin extending through said pin opening for pivotal support of said lever, said pin being retained in assembled relationship by abutment at opposite ends with respective straps, a ratchet member pivotally supported between said straps and comprising a plurality of lugs of progressively varying lengths and adapted to be engaged with one end of said block, and retaining means adapted to engage the opposite end of said block and at least one of said straps for securing said opposite end with respect to said body.

3. In a slack adjuster pull rod, spaced straps defining a body, a brake lever support block mounted in said body and movable longitudinally thereof, guide means on said block engaging said straps, means including a ratchet member engaged with one end of said block for adjustably securing said block against movement in one direction with respect to said body, and means for adjustably securing said block against movement in the opposite direction with respect to said body, said last-mentioned means comprising a plurality of aligned openings in said straps, and a member adapted to be selectively engaged with said openings and with a portion of said block.

4. In a slack adjuster pull rod, spaced straps defining a body, a brake lever support block mounted in said body and movable longitudinally thereof, guide means on said block engaging said straps, means for adjustably securing said block against movement in one direction with respect to said body, and means for adjustably securing said block against movement in the opposite direction with respect to said body, said last-mentioned means comprising a plurality of openings in said straps, and a member adapted to be selectively engaged with said openings and with a portion of said block, the openings in each strap being alternately arranged with respect to the openings in the other strap.

5. In a slack adjuster device, spaced straps defining a body, a brake lever support block mounted in said body and movable longitudinally thereof, guide means on said block engaging said straps, means including a ratchet member engaged with one end of said block for adjustably securing said block against movement in one direction with respect to said body, and means for adjustably securing said block against movement in the opposite direction with respect to said body, said last-mentioned means comprising a pair of lugs on said block, a plurality of openings in said straps, and a member adapted to be engaged with one or the other of said lugs and selectively engaged with said openings.

6. In a slack adjuster device, spaced straps defining a body, a brake lever support block engaged with said straps and adapted to move longitudinally with respect thereto, ratchet means between said straps and pivotally connected thereto for adjustably securing one end of said block, and removable means for securing the opposite end of said block within said body, said removable means comprising a pin member projecting through a portion of said block and adapted to be selectively engaged with aligned openings through said straps.

7. In a slack adjuster device, spaced straps defining a body, a brake lever support block engaged with said straps and adapted to move longitudinally with respect thereto, means between said straps and pivotally connected thereto for adjustably securing one end of said block, and removable means for securing the opposite end of said block within said body, said removable means comprising a pin member projecting through a portion of said block and through one or the other of said straps, said pivotal connection being adjustable longitudinally of said straps.

8. In a slack adjuster device of the class described, a body, a block therein comprising a lever slot, removable lever pivot means extending through said block, said pivot means being adapted to bear at each end thereof against said body to maintain said pivot means in assembled relationship with said block, means for adjustably securing said block against movement within said body, and an opening in said body formed and arranged to permit the removal of said pivot means while said block remains in assembled relationship within the body.

9. In a slack adjuster device, a body defined by spaced straps, a block therebetween in movable engagement therewith, guide means on said block engaging said strap, a recess in one end of the block, a ratchet pivotally supported between said straps and comprising a plurality of lugs of varying lengths and adapted to be selectively positioned in said recess, and retaining means adapted to be engaged with the opposite end of the block and with said body.

10. In a slack adjuster device, a body defined by spaced straps, a block therebetween in movable engagement therewith, guide means on said block engaging said straps, a recess in one end of the block, a ratchet pivotally and adjustably supported between said straps and comprising a plurality of lugs of varying lengths adapted to be selectively positioned in said recess, and retaining means adapted to be engaged with the opposite end of the block and with said body.

11. In a slack adjuster, a body defined by spaced straps, a block movably mounted between said straps, and means for adjustably securing said block against movement in said body, said means comprising a ratchet member adjustably engaged with one end of said block, alternately arranged openings in said straps adjacent the opposite end of said block, and a retaining means adapted to engage said opposite end and to be selectively engaged with said openings.

12. In a slack adjuster of the class described, a body, a hollow block therein, a member extending into said block, pivot means connecting said member to said block, means for adjustably securing said block against movement within said body, and an opening in said body for removing said pivot means while said block remains in normal assembled relationship with said body.

13. In a slack adjuster of the class described, a body, a block movably mounted in said body for movement longitudinally thereof, means for adjustably securing said block against said movement including means within said body and pivotally connected thereto, said pivotal connection being adjustable longitudinally of said body.

14. In a slack adjuster device, a body, a support block mounted therein and adapted to move longitudinally with respect thereto, a ratchet member comprising lugs of varying sizes adapted to be selectively engaged with one end of the block, said ratchet member being pivotally connected within said body, and means for securing the opposite end of said block.

15. In a slack adjuster device, spaced straps defining a body, a brake lever support block engaged with said straps and adapted to move longitudinally with respect thereto, means between said straps and pivotally connected thereto for adjustably securing one end of said block, and removable means for securing the opposite end of said block within said body, said pivotal connection being adjustable longitudinally of said straps.

16. In a slack adjuster device, a body, a support block therein and comprising a slot, a brake lever in said slot, pivot means connecting said lever to said block, means for adjustably securing said block against movement within said body, and an opening in said body for removing said pivot means while said block remains in assembled relationship with said body.

17. In a slack adjuster, a body, a support block therein comprising means on the sides thereof for guiding engagement with said body, a lever slot through said block and closed at opposite ends thereof, a lever in said slot, a pin opening extending transversely of said block, a pin opening in said lever aligned with the first-mentioned pin opening, a headless pin extending through said openings, means for adjustably securing said block against longitudinal movement within said body, and a pin opening in at least one side of said body for removing said pin therefrom while said block remains in normal assembled relationship within said body.

18. In a slack adjuster, spaced straps defining a body, a block within said body and comprising a lever slot, said slot being closed at opposite ends of said block, a lever in said slot, aligned pin openings through said lever and said block, a headless pin extending through said openings, said pin being adapted to abut said straps to prevent accidental disassembly of said pin, a plurality of aligned openings through said straps, a pivotal member disposed therebetween for adjustably securing said block against movement in one direction longitudinally of said body, a pivot pin extending through the last-mentioned openings and through said member for pivotal support thereof, said last-mentioned pin being readily removable and being of a diameter as large as that of the first-mentioned pin, and means for adjustably securing said block against movement in the other direction longitudinally of said body, said first-mentioned pin being removable through said last-mentioned opening when said pivot pin and said member have been dissociated from said body and while said block remains in normal assembled relationship within said body.

19. In a slack adjuster device, spaced straps defining a body, a brake lever support block movably mounted in said body and adapted to move longitudinally with respect thereto, means between said straps and pivotally connected thereto for adjustably securing said block against movement in one direction longitudinally of said straps, and means for adjustably securing said block against movement in the other direction longitudinally of said straps, said pivotal connection being adjsutable longitudinally of said straps.

20. In a slack adjuster device, a body, a support block movably mounted in said body, and means for restraining movement of said block within said body in each direction longitudinally thereof, said means including a ratchet member comprising lugs of varying sizes adapted to be selectively engaged with one end of said block.

NORMAN FLESCH.